(12) United States Patent
Malecki et al.

(10) Patent No.: US 11,868,310 B2
(45) Date of Patent: Jan. 9, 2024

(54) COMPOSITE STORAGE OF OBJECTS IN MULTI-TENANT DEVICES

(71) Applicant: INTERNATIONAL BUSINESS MACHINES CORPORATION, Armonk, NY (US)

(72) Inventors: Bartlomiej Tomasz Malecki, Slomniki (PL); Maria Hanna Oleszkiewicz, Smardzowice (PL); Daniel Jakub Ryszka, Cracow (PL); Blazej Rafal Rutkowski, Cracow (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 188 days.

(21) Appl. No.: 16/800,179

(22) Filed: Feb. 25, 2020

(65) Prior Publication Data
US 2021/0263887 A1 Aug. 26, 2021

(51) Int. Cl.
*G06F 16/11* (2019.01)
*G06F 16/14* (2019.01)

(52) U.S. Cl.
CPC ......... *G06F 16/122* (2019.01); *G06F 16/14* (2019.01)

(58) Field of Classification Search
CPC ....... G06F 16/122; G06F 16/14; G06F 16/903
See application file for complete search history.

(56) References Cited

U.S. PATENT DOCUMENTS

| | | | |
|---|---|---|---|
| 9,396,131 B1 * | 7/2016 | Hendry | G06F 3/0608 |
| 10,108,669 B1 | 10/2018 | Krishnamoorthy et al. | |
| 10,152,508 B2 | 12/2018 | Weissman et al. | |
| 2012/0179646 A1 * | 7/2012 | Hinton | G06F 16/25 707/607 |
| 2015/0213285 A1 | 7/2015 | Malko et al. | |
| 2016/0292216 A1 * | 10/2016 | Joshi | G06F 16/2471 |
| 2016/0334998 A1 * | 11/2016 | George | G06F 3/067 |
| 2017/0091231 A1 | 3/2017 | DiFranco et al. | |

(Continued)

OTHER PUBLICATIONS

Mell et al., "The NIST Definition of Cloud Computing", NIST, Special Publication 800-145, Sep. 2011, 7 pages.

(Continued)

*Primary Examiner* — Mark D Featherstone
*Assistant Examiner* — Faezeh Forouharnejad
(74) *Attorney, Agent, or Firm* — Rakesh Roy; Andrew D. Wright; Calderon Safran & Cole, P.C.

(57) ABSTRACT

Systems and methods for composite storage of data across tiers of a multi-tenant storage device are provided. In embodiments, a method includes determining attributes associated with each query in a set of queries; determining whether each of the attributes meet respective predetermined threshold values for a first storage tier, a second storage tier and a third storage tier based on statistical data generated for the attributes; updating storage rules for at least one of the first storage tier, the second storage tier and the third storage tier based on the determining; receiving data from the tenant for storage; dividing the data into at least a first portion and a second portion based on the storage rules; and storing the at least the first portion and the second portion on separate ones of the first storage tier, the second storage tier and the third storage tier based on the storage rules.

17 Claims, 9 Drawing Sheets

(56) References Cited

U.S. PATENT DOCUMENTS

2017/0177638 A1* 6/2017 Bhosale ................ G06F 16/185
2018/0004783 A1* 1/2018 Mehrotra .............. G06F 16/252
2018/0173423 A1* 6/2018 Dain .................... G06F 3/0649
2018/0253653 A1* 9/2018 Ozcan ................... G06F 16/367

OTHER PUBLICATIONS

Anonymous, "Multitenancy considerations", https://druid.apache.org/docs/latest/querying/multitenancy.html, accessed Jan. 24, 2020, 3 pages.

\* cited by examiner

BOOK EXAMPLE

```
{
  "isbn": "1234567891011",
  "title": "Pocket Guide",
  "subtitle": "A Working Introduction",
  "author": "John A. Doe",
  "published": "2013-08-02T00:00:00.000Z",
  "publisher": "General Media",
  "publisher_homepage": "https://www.generalmedia.com/",
  "pages": 234,
  "description": "This pocket guide is the perfect on-the-job companion. It provides a compact, readable introduction for new users, as well as a reference to common commands and procedures for those of you with experience.",
  "website": "http://pocketguide.com/books/1230000000000/index.html",
  "review": ".....some really lengthy text",
  "cover": "book cover in jpg format"
  "content": {
    "pdf": "...content of the book in pdf format",
    "mobi": "...content of the book in mobi format"
  }
}
```

FIG. 6

PART 1–INITIAL TOPOLOGY TIER

Object Identity 800 →

```
{
  "id": 1 ,<- identity assigned to this document
  "properties": {
    "resource_type": "book", <- type of the document (a format of the document)
    "isbn": "1234567891011",
    "author": "John A Doe"
  }
}
```

FIG. 7A

PART 1–ADAPTIVE TOPOLOGY TIER

Object Identity 800 →

ISBN attribute removed

```
{
  "id": 1,
  "properties": {
    "resource_type": "book
    "author": "John A. Doe",
    "publisher": "General Media" <- attribute propagated from Tier 2
  }
}
``` added attribute

FIG. 7B

```
{      PART 2-INITIAL MAIN OBJECT TIER
    "isbn": "1234567891011",
    "title": "Pocket Guide",
    "subtitle": "A Working Introduction",
    "published": "2013-08-02T00:00:00.000Z",
    "publisher": "General Media",
    "publisher_homepage": "https://www.generalmedia.com/",
    "pages": 234,
    "description": "This pocket guide is the perfect on-the-job companion. It provides a compact, readable introduction for new users, as well as a reference to common commands and procedures for those of you with experience.",
    "website": "http://pocketguide.com/books/1230000000000/index.html",
}
```

FIG. 8A

```
{      PART 2-ADAPTIVE MAIN OBJECT TIER
    "isbn": "1234567891011",
    "title": "Git Pocket Guide",
    "subtitle": "A Working Introduction",
    "published": "2013-08-02T00:00:00.000Z",
    "publisher": "O'Reilly Media",
    "publisher_homepage": "https://www.oreilly.com/",
    "pages": 234,
    "description": "This pocket guide is the perfect on-the-job companion. It provides a compact, readable introduction for new users, as well as a reference to common commands and procedures for those of you with experience.",
    "website": "http://pocketguide.com/books/1230000000000/index.html",
    "cover": "book cover in jpg format"    ← added attribute
}
```

FIG. 8B

PART 3 – INITIAL LINKED OBJECT TIER

```
{
  "review": ".....some really lengthy text",
  "cover": "book cover in jpg format"
  "content": {
    "pdf": "...content of the book in pdf format",
    "mobi": "...content of the book in mobi format"
  }
}
```

FIG. 9A

PART 3 – ADAPTIVE LINKED OBJECT TIER

```
{
  "review": ".....some really lengthy text",
  "cover": "book cover in jpg format"
  "content": {
    "pdf": "...content of the book in pdf format",
    "mobi": "...content of the book in mobi format"
  }
}
```

↗ Identical to Initial Linked Object Tier

FIG. 9B

COMPOSITE STORAGE OF OBJECTS IN MULTI-TENANT DEVICES

BACKGROUND

Aspects of the present invention relate generally to data storage and, more particularly, to composite storage of data objects in multiple tiers of a multi-tenant storage device.

A multi-tenant cloud is a cloud computing architecture that allows customers or tenants to share computing resources in a public or private cloud. A tenant is a group of users who share a common access with specific privileges to a single instance of software. Each tenant's data is isolated and remains invisible to other tenants. Typically, each data object of a tenant is saved in one particular storage area of a multi-tenant storage device. A tenant may query the multi-tenant storage device to obtain query results in the form of stored object data. One type of query tool is GraphQL, which is an open-source data query and manipulation language for application programing interfaces (APIs).

A multi-tenant storage device may save data objects on one or multiple tiers based on storage rules. In some cases, different data objects are stored on different tiers based on how recent the data is. This type of tiered storage enables more recent segments to be hosted on more powerful hardware, for example.

SUMMARY

In a first aspect of the invention, there is a computer-implemented method including: determining, by a multi-tenant storage device, object attributes associated with each query in a set of queries submitted by a tenant over time, wherein the multi-tenant storage device is configured to store data in a first storage tier, a second storage tier and a third storage tier; determining, by the multi-tenant storage device, whether each of the object attributes meet respective predetermined threshold values for the first storage tier, the second storage tier and the third storage tier based on statistical data generated for the object attributes; updating, by the multi-tenant storage device, tenant-specific storage rules for at least one of the first storage tier, the second storage tier and the third storage tier based on the determining whether each of the object attributes meet the respective predetermined threshold values; receiving, by the multi-tenant storage device, a data object from the tenant for storage; dividing, by the multi-tenant storage device, the data object into at least a first portion and a second portion based on the tenant-specific storage rules; and storing, by the multi-tenant storage device, the at least the first portion and the second portion on separate ones of the first storage tier, the second storage tier and the third storage tier based on the tenant-specific storage rules.

In another aspect of the invention, there is one or more computer readable storage media and program instructions collectively stored on the one or more computer readable storage media. The program instructions are executable by a multi-tenant storage device to cause the multi-tenant storage device to: generate statistics data regarding object attributes for a set of queries submitted by a tenant of the multi-tenant storage device; determine that statistics data for a first object attribute meets a first predetermined threshold value associated with a first storage tier of the multi-tenant storage device; update tenant-specific storage rules based on the statistics data for the first object attribute meeting the first predetermined threshold value; determine that statistics data for a second object attribute meets a second predetermined threshold value associated with a second storage tier of the multi-tenant storage device; update the tenant-specific storage rules based on the statistics data for the second object attribute meeting the second predetermined threshold value; receive a data object for storage from the tenant; divide the data object into at least a first portion and a second portion based on the tenant-specific storage rules; and store the first portion on the first storage tier and the second portion on the second storage tier based on the tenant-specific storage rules.

In another aspect of the invention, there is system including a processor, a computer readable memory, one or more computer readable storage media, and program instructions collectively stored on the one or more computer readable storage media. The program instructions are executable to cause a multi-tenant storage device to: generate statistics data regarding object attributes for a set of queries of a tenant of the multi-tenant storage device; determine whether each of the object attributes meet respective predetermined threshold values for a first storage tier, a second storage tier and a third storage tier of the multi-tenant storage device based on the statistics data; update tenant-specific storage rules based on the determining whether each of the object attributes meet the respective predetermined threshold values; receive a data object from the tenant for storage; divide the data object into at least a first portion and a second portion based on the tenant-specific storage rules; and store the at least the first portion and the second portion on separate ones of the first storage tier, the second storage tier and the third storage tier based on the tenant-specific storage rules.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 6 is an example of a data object in the form of a book stored in accordance with aspects of the present invention.

FIG. 7A is an initial first storage tier (topology storage tier) in accordance with aspects of the present invention.

FIG. 7B is an adaptive first storage tier (topology storage tier) in accordance with aspects of the invention.

FIG. 8A is an initial second storage tier (main object storage tier) in accordance with aspects of the present invention.

FIG. 8B is an adaptive second storage tier (main object storage tier) in accordance with aspects of the invention.

FIG. 9A is an initial third storage tier (linked object storage tier) in accordance with aspects of the present invention.

FIG. 9B is an adaptive third storage tier (linked object storage tier) in accordance with aspects of the invention.

DETAILED DESCRIPTION

Figure 1:
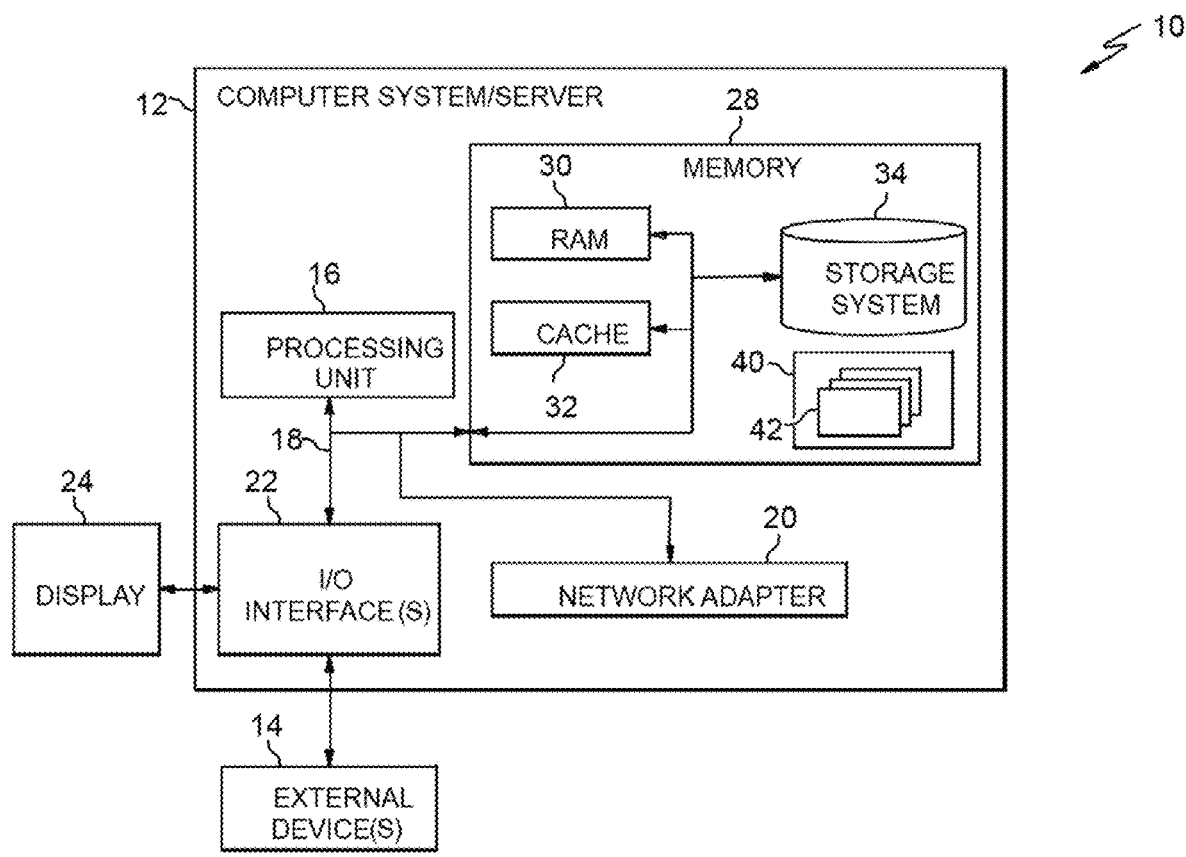
FIG. 1 depicts a cloud computing node according to an embodiment of the present invention.

Aspects of the present invention relate generally to data storage and, more particularly, to composite storage of data objects in multiple tiers of a multi-tenant storage device. Embodiments of the invention spread individual portions of a data object among multiple tiers of a multi-tier multi-storage device based on historic use of the storage device by tenants. In embodiments, a multi-tenant storage device is provided having a topology tier (first or upper tier), a main object tier (second or middle tier), and a linked object tier (third or lower tier). In embodiments, the term tier or storage tier as used herein refers to a distinct storage area and/or storage media for storing data according to methods of the present invention.

Multi-tenant storage environments enable the sharing of at least some underlying storage across multiple customers or tenants, and are especially useful when handling free instances of some cloud offerings. It is a challenge to define data storage in a multi-tenant storage environment in such a way that the environment will behave consistently across various tenants running various types of workloads. While the stored data itself may share the same or similar format across all tenants, the usage patterns of the data may differ drastically. In one example, different types of assets with different properties are stored in a multi-tenant storage device, including the following: Asset A: (name, create-Time, . . . , property1, property2); Asset B: (name, . . . , property1, property2). A first customer may have a large number of objects of type Asset A, and few objects of type Asset B. A second customer may not have any objects of type Asset A at all. A third customer may frequently issue queries like: find all object with property1 set to some_value. A fourth customer may utilize different properties for filtering stored data. For one customer values for property2 may be large objects, while for others the values are relatively small. In this situation, modeling data storage for all customers (clustering/indexes/etc.) will not produce a storage strategy equally beneficial to all customers.

Unlike existing storage devices which save a data object in one particular storage area of a multi-tenant system, embodiments of the invention provide an improved multi-tenant storage device to perform composite storage of data objects over multiple tiers (storage layers) of the storage device. Aspects of the invention provide technical solutions to the problem of accessing data objects in a multi-tenant storage environment by saving a data object across multiple tiers in a manner that improving the efficiency of query searches. In implementations, properties of data objects (object attributes) which have been determined to be most-accessed by a particular tenant are moved to an upper layer for quicker access, while properties that are less used or data that is more than a predetermined size is stored on lower tiers.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations).

It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
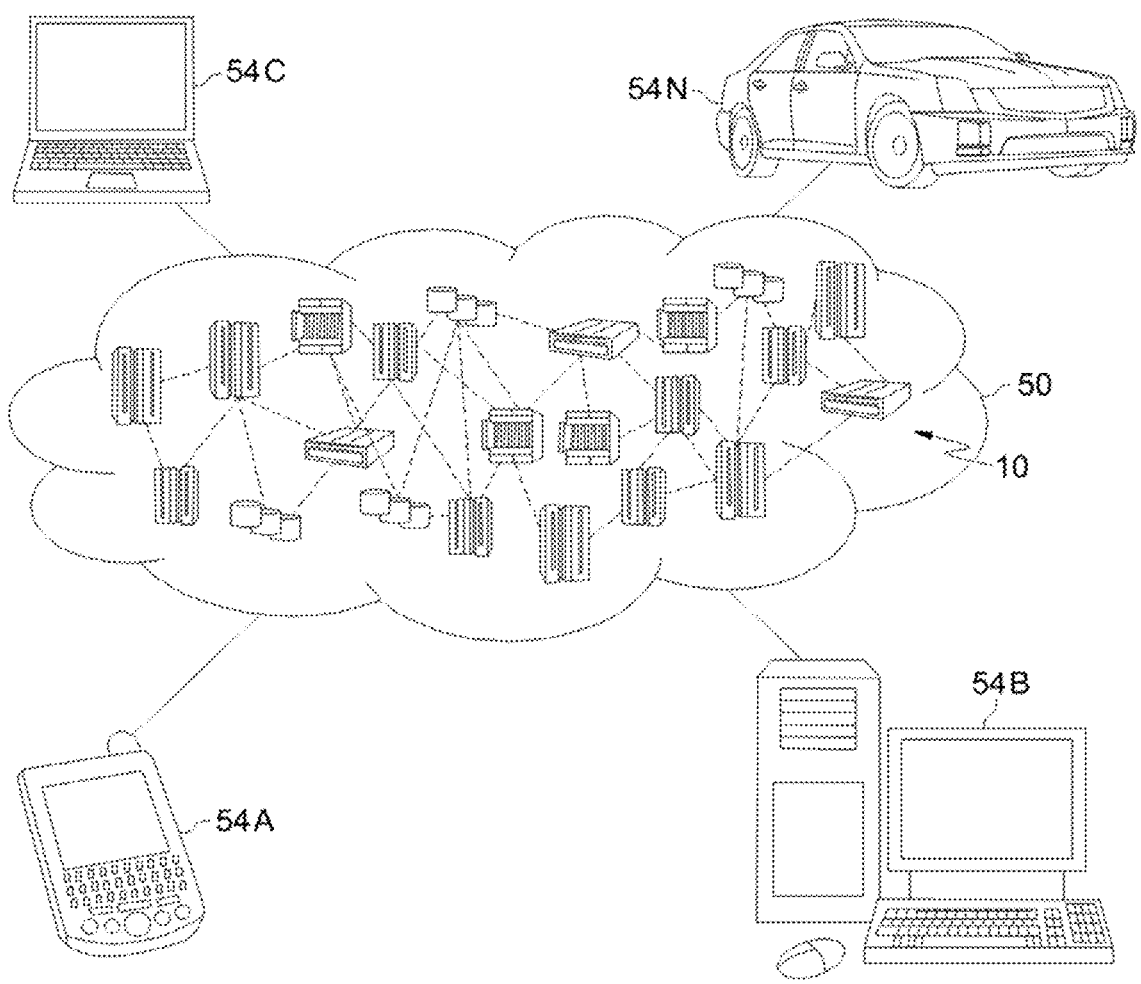
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
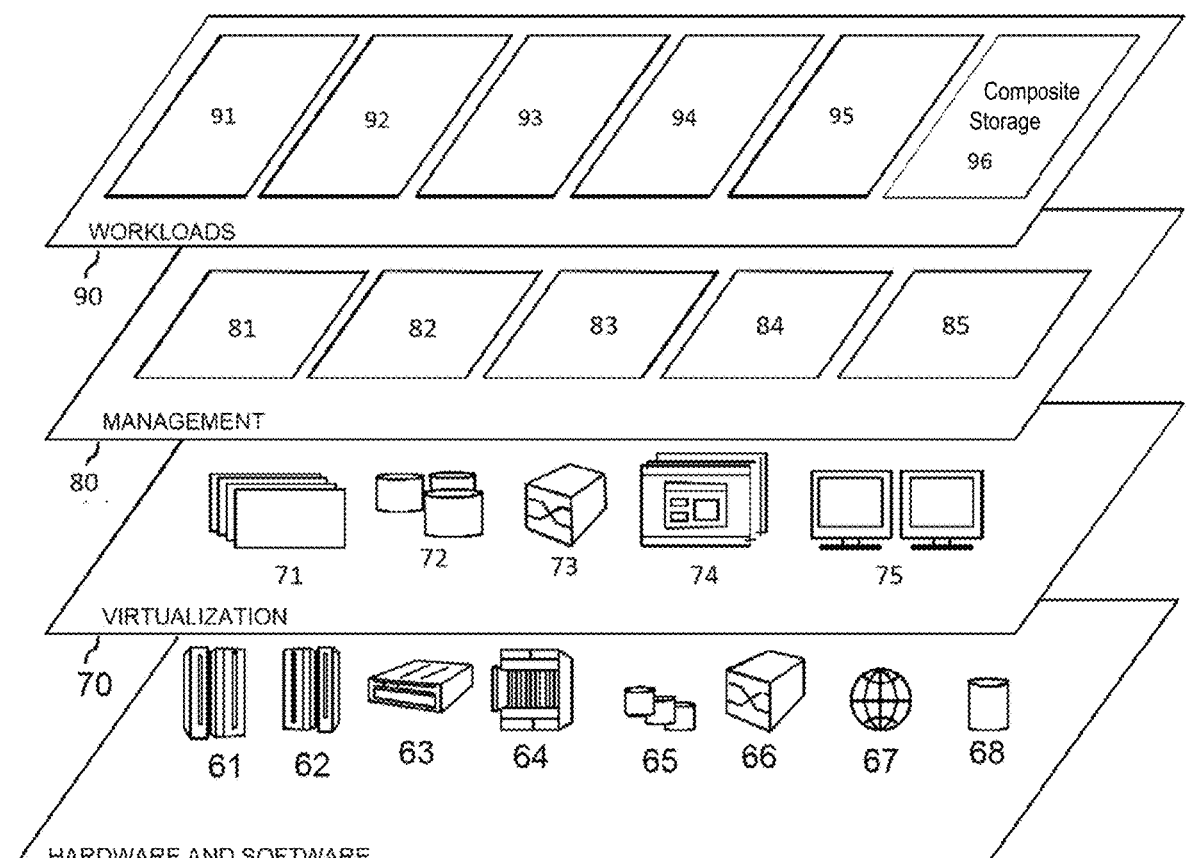
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and composite storage 96.

Implementations of the invention may include a computer system/server 12 of FIG. 1 in which one or more of the program modules 42 are configured to perform (or cause the computer system/server 12 to perform) one or more functions of the composite storage 96 of FIG. 3. For example, the one or more of the program modules 42 may be configured to: collect query data over time for individual tenants of a multi-tenant storage environment; generate statistics data for object attributes of the query data; determine whether the object attributes meet threshold values for first, second and third storage tiers of a storage device; update storage rules for the tenant based on the determining; receive data objects for storage; divide the data object into portions to be stored on different storage tiers according to the updated storage rules for the tenant; and receive and answer tenant queries for stored data.

Figure 4:
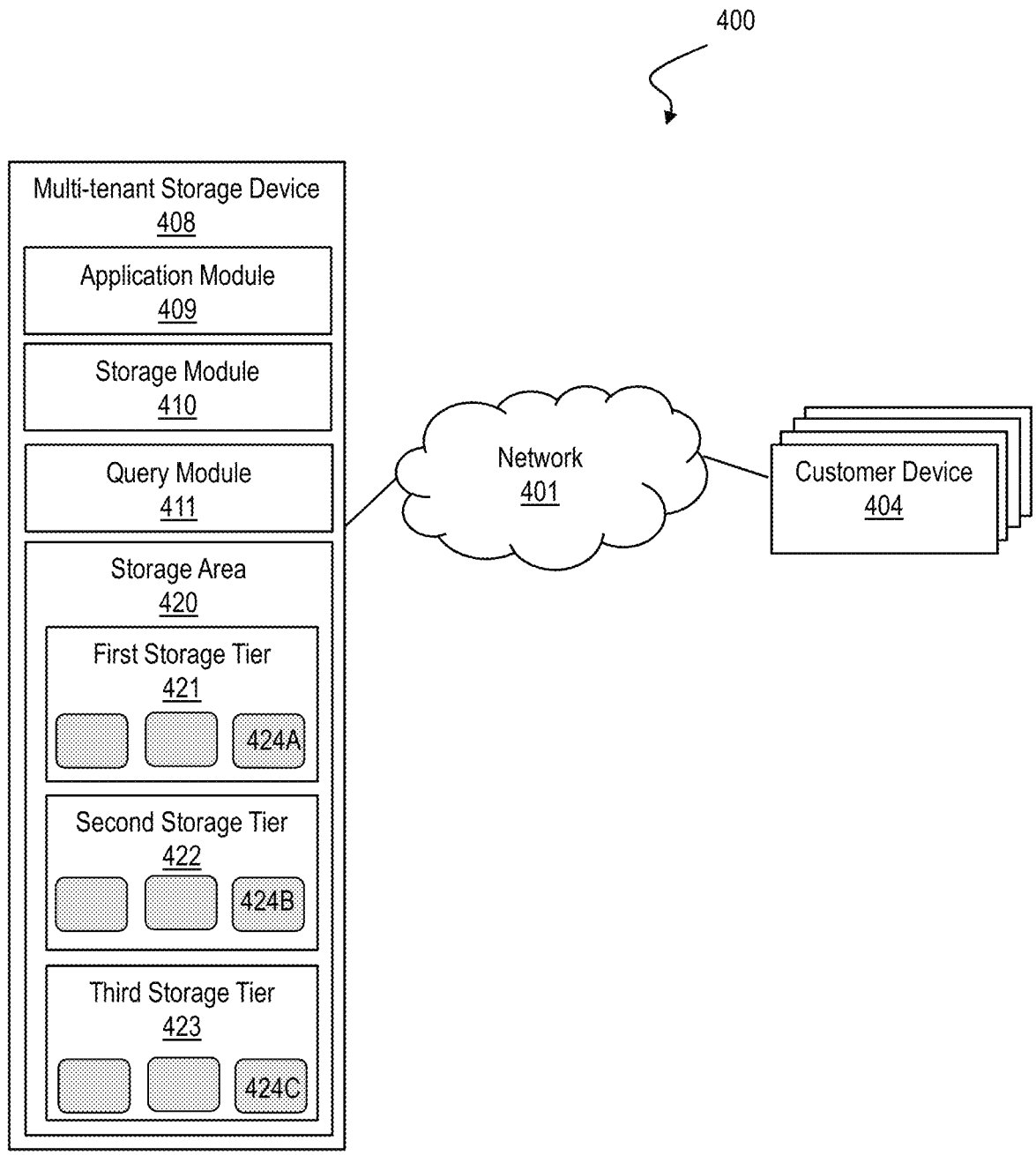
FIG. 4 shows a block diagram of an exemplary environment in accordance with aspects of the invention.

FIG. 4 shows a block diagram of an exemplary multi-tenant storage environment 400 in accordance with aspects of the invention. In embodiments, the multi-tenant storage environment 400 includes a network 401 connecting a plurality of customer devices 404 with a multi-tenant storage device 408 (hereafter storage device 408). Each of the customer devices 404 may include components of the computer system 12 of FIG. 1, and may be a desktop computer, laptop computer, tablet, smartphone, or other personal computing device, for example.

The network 401 may be any suitable communication network or combination of networks, such as a local area network (LAN), a general wide area network (WAN), and/or a public network (e.g., the Internet). In implementations, an application module 409 of the storage device 408 enables multiple tenants (via customer devices 404) to access stored data in the storage device 409. The term tenant as used herein refers to a group of users who share a common access with specific privileges to the storage device 408. The storage device 408 may also include components of the computer system 12 of FIG. 1, and may comprise a special purpose computing device configured to store data objects across multiple storage tiers or layers for multiple tenants. In implementations, the storage device 408 is a cloud computing node 10 within the cloud computing environment 50 of FIG. 2.

Still referring to FIG. 4, the storage device 408 may include one or more program modules (e.g., program module 42 of FIG. 1) executed by the storage device 408 and configured to perform one or more functions described herein. In embodiments, the storage device 408 includes one or more of the following: the application module 409, a storage module 410, a query module 411, and at least one storage area 420. In aspects, the at least one storage area 420 includes separate and distinct storage areas or tiers, including a first storage tier 421 (e.g., a topology tier), a second storage tier 422 (e.g., a main object tier) and third storage tier (e.g., a linked object tier). Although depicted in a single storage areas 420 of a single storage device 408, the present invention may comprise multiple storage areas 420 across multiple storage devices within a network environment.

In embodiments, the application module 409 is configured to enable tenants of the multi-tenant environment 400 access to data saved in the storage device 408. In aspects, the application module 409 is configured to receive queries from users, and return results of those queries to the users (e.g., via the customer devices 404). In embodiments, the application module 409 utilizes GraphQL open-source data query software. In implementations, the application module 409 stores user access rules (e.g., permissions and security rules) for multiple tenants and/or users.

In implementations, the storage module 410 of the storage device 408 is configured to divide data objects into at least two portions (e.g., 424A, 424B, 424C) and save the portions of the data object across multiple storage tiers (e.g., 421-423) of the storage device 408 according to saved storage rules. The storage rules may include default or initial storage rules, and adaptive storage rules which have been generated by the query module 411 to reflect actual use of the storage device 408 by a tenant. In aspects, storage device 408 stores customized or adaptive storage rules for each tenant in the multi-tenant environment 400.

In implementations, the query module 411 of the storage device 408 is configured to: collect statistical data regarding stored object attributes (e.g., title, pages, description, international standard book number (ISBN), etc.) associated with queries of a tenant; analyze the statistical data; determine whether to update storage rules for a tenant based on the analysis and predetermined threshold values; and update the storage rules as needed to provide adaptive storage rules to be utilized by the storage device 408 when storing data objects of the tenant.

In implementations, the first storage tier 421 of the storage area 420 is a topology tier. In embodiments, the first storage tier 421 is configured to enable efficient access to portions of stored data objects which are most often accessed or utilized by a tenant. In implementations, the second storage tier 422 is a main object tier configured to store a main portion of data objects of a tenant when those data objects have a size less than a predetermined threshold value. In implementations, the third storage tier 423 is a linked object tier configured to store remaining portions of a data object not stored in the first or second storage tiers 421, 422 and/or portions of the data objects that are larger than the predetermined threshold value.

In embodiments, the storage device 408 may include additional or fewer components than those shown in FIG. 4. In embodiments, separate components may be integrated into a single computing component or module. Additionally, or alternatively, a single component may be implemented as multiple computing components or modules. Additionally, the quantity of devices and/or networks in the multi-tenant environment 400 is not limited to what is shown in FIG. 4. In practice, the multi-tenant environment 400 may include additional devices and/or networks; fewer devices and/or networks; different devices and/or networks; or differently arranged devices and/or networks than illustrated in FIG. 4. Devices of the multi-tenant environment 400 may interconnect via wired connections, wireless connections, or a combination of wired and wireless connections.

Figure 5:
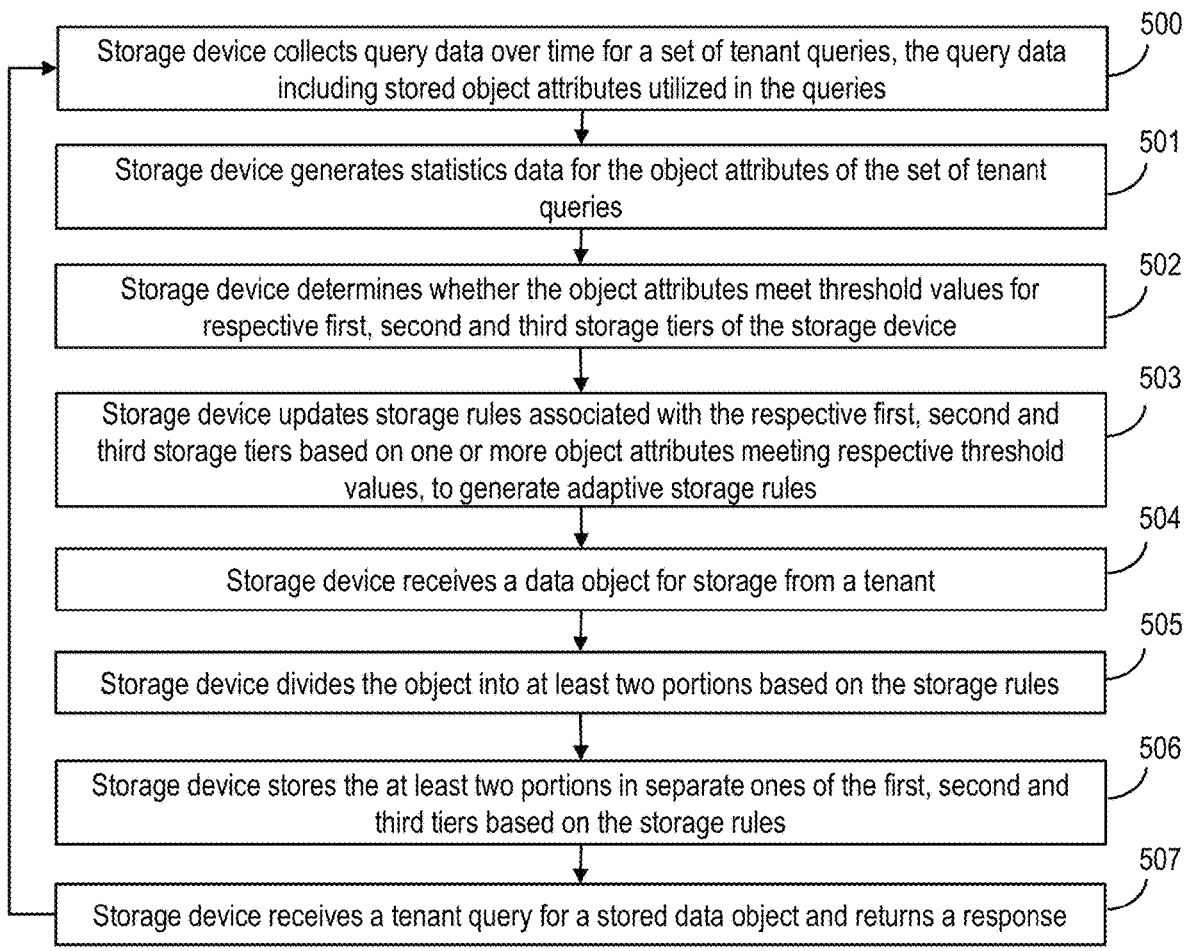
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 500, the storage device 408 collects query data over time for a set of queries of a tenant, wherein the query data includes stored object attributes utilized in the queries. The term object attributes as used herein refers to properties of stored data objects being used for querying. For example, object attributes that may be utilized by tenants to search for books include: resource type, author, ISBN, and publisher. In embodiments, queries (e.g., GraphQL queries) are analyzed by the storage device 408 to extract properties used only in direct lookups. In implementations, the storage device 408 collects query data for a plurality of individual tenants of the multi-tenant environment 400, and stores the query data by tenant. The storage device 408 may collect query data continuously or periodically In aspects, the query module 411 of the storage device 408 implements step 500.

At step 501, the storage device 408 generates statistics data for the object attributes of the set of queries of the tenant. In implementations, the storage device 408 determines the object attributes associated with each query in the set of queries and generates statistics based thereon, such as how frequently an object attribute (e.g., title) is utilized by the tenant. In aspects, the storage device 408 generates statistics data periodically (e.g., based on stored rules) for individual tenants in the multi-tenant environment 400. In aspects, the storage device 408 periodically generates statistics data regarding object attributes used frequently/infrequently in queries and object attributes frequently/infrequently updated. In embodiments, the query module 411 of the storage device 408 implements step 501.

At step 502, the storage device 408 determines whether each of the object attributes in the set of tenant queries meet threshold values for respective first, second and third storage tiers (e.g., 421-423) of the storage device 408 based on the statistics data. In implementations, the threshold values are predetermined threshold values stored in the storage device 408. In embodiments, the threshold values are configurable by one or more users (e.g., tenants) via a user interface provided by the storage device 408. In one example, the storage device 408 determines that a particular tenant has utilized the object attribute "title" in the set of tenant queries more than 60% of the time, and thus the object attributes "title" meets the threshold (60%) for inclusion in the first storage tier 421 (e.g., topology tier). In another example, the storage device 408 determines that the tenant utilizes the object attribute "publisher" less than a threshold amount (e.g., 60%) associated with the first storage tier 421, but more than a threshold amount (e.g., 30%) for the second tier 422 (e.g., main object tier), and thus determines that the object attribute "publisher" meets the threshold for inclusion in the second storage tier 422. In implementations, the storage device 408 determines if statistics regarding object attribute size meet predetermined threshold size values associated with one or more of the first, second and third storage tiers 421-423. For example, the second storage tier 421 may have a size limit (maximum size threshold value) of 10 megabytes (MB) for object attribute data. In this example, the storage device 408 would determine that any object attribute data over 10 megabytes (MB) should be stored in the third storage tier 423. In embodiments, the storage module 410 of the storage device 408 implements step 502.

At step 503, the storage device 408 updates storage rules associated with the respective first, second and third storage tiers 421-423 based on one or more of the object attributes in the set of tenant queries meeting threshold values at step 502, to generate adaptive storage rules. In embodiments, initial or default storage rules are saved on the storage device 408 for each tenant of the multi-tenant environment 400. In aspects, the initial or default storage rules are configurable by one or more users (e.g., tenants) via a user interface supplied by the storage device 408. In embodiments, object attributes used for filtering results in queries may be used by the storage device 408 to update the storage rules. Thus, statistics regarding properties used for filtering may be used by the storage device 408 to decide whether to move properties between the first storage tier 421 and the second storage tier 422, for example. In implementations, statistics regarding property size and GraphQL queries are used by the storage device 408 to decide whether to move properties between the second storage tier 422 and the third storage tier 423.

In embodiments, updates to the storage rules may result in object attributes in the first storage tier 421 also appearing in a lower storage tier (i.e., second storage tier 422 or third storage tier 423); however object attributes from lower tiers are not duplicated in higher tiers. That is, in implementations, if an object attribute is moved up into a storage tier, it may also remain in the lower storage tier, but if an object attribute is moved from an upper tier to a lower tier it is removed from the upper tier.

Still referencing step 503 of FIG. 5, it can be understood that, over time, the storage device 408 updates storage rules to adapt to the manner in which a tenant is utilizing/accessing stored data on the storage device 408 based on the statistical analysis of query data of the tenant. Thus, in embodiments of the invention the storage device 408 dynamically adapts storage rules to individual tenants of the storage device 408 based on incoming query data. In implementations, stored threshold values are set for the first, second and third storage tiers 421-423 in order to disperse portions of data objects such that: the most frequently accessed object attributes are saved in the first storage tier 421; other frequently accessed and relatively small portions of the data object are saved on the second storage tier 422; and the remaining portions of the data object (e.g., large properties required only by lookups) are saved on the third storage tier 423. For example, the dynamic adjustment of storage rules may result in the storage device 408: promoting from a lower storage tier to a higher storage tier properties frequently used in queries; promoting from a lower storage tier to an upper storage tier (depending on their size statistics) properties frequently updated; removing from the first storage tier 421 properties used infrequently; removing from the first storage tier 421 properties infrequently updated; moving large properties not returned by queries to the third storage tier 423; and moving very large properties to the third storage tier 423. In embodiments, the storage module 410 of the storage device 408 implements step 503.

At step 504, the storage device 408 receives a data object for storage from a tenant. For example, the tenant may wish to store a book on the storage device 408. In embodiments, the application module 409 of the storage device 408 receives the data object directly from a tenant or from a customer device 404 via the network 401 and sends a communication to the storage module 410 of the storage device 408 regarding the incoming data object.

At step 505, the storage device 408 divides the data object received at step 504 into at least two portions based on the storage rules (e.g., adaptive storage rules), wherein portions of the data object associated with different object attributes are stored on different tiers of the storage device 408. In implementations, some overlap exists between data stored on different storage tiers 421-423 of the storage device 408. For example, storage rules may require portions of a data object associated with the object attribute "ISBN" to be stored on both the first tier 421 and the second tier 422. In embodiments, the storage device 408 divides the data object into three parts including a first portion to be saved on the first storage tier 421, a second portion to be saved on the second storage tier 422 and a third portion to be saved on the third storage tier 423 based on object attributes of the data object.

In one example, the storage device 408 stores: a portion of the data object associated with ID, properties, resource type, ISBN and author on the first storage tier 421; a second portion of the data object associated with ISBN, title, subtitle, published, publisher, publisher homepage; pages, description, and website on the second storage tier 422; and stores the remaining third portion of the data object in the third storage tier 423, including the portion of the data object associated with review, cover, content, PDF (portable document format), and mobi (a file extension used to store electronic books).

In implementations, the storage rules include threshold size values for each of the first, second and third storage tiers 421-423, and the storage device 408 also divides the data object into portions based on the size of object attributes. For example, in aspects, an object attribute of a data object meeting threshold values for inclusion in the first storage tier 421 and/or second storage tier 422 must also meet a threshold size value for those respective storage tiers. In implementations, object attributes having greater than the threshold size value for a particular tier are bumped to a lower tier (e.g., second storage tier 422 or third storage tier 423) depending on their size. In embodiments, the storage module 410 of the storage device 408 implements step 505.

At step 506, the storage device 408 stores the at least two portions of the data object in separate ones of the first, second and third storage tiers 421-423 based on the storage rules (e.g., adaptive storage rules). In implementations, the storage device 408 stores a first portion of the data object in the first storage tier 421, a second portion of the data object in the second storage tier 422, and a third portion of the data object in the third storage tier 423. In aspects, the first portion comprises most frequently accessed object attributes, the second portion comprises the remaining frequently accessed object attributes having a size less than a threshold size, and the third portion comprises the remainder of the object data, including object attributes having a size greater than the threshold size and least frequently accessed object attributes. In implementations, the storage device 408 stores a unique identifier or ID for the data object in all three storage tiers 421-423. In embodiments, the storage module 410 of the storage device 408 implements step 505.

At step 507, the storage device 408 receives a tenant query for a stored data object and returns a response. In implementations, the storage device 408 receives a query directly, or from a client device 404 via the network 401. In embodiments, the storage device 408 enables direct lookup of a data object by the object ID, wherein the storage device 408 checks for the existence of data on all three storage tiers 421-423 using the object ID. In implementations, the storage device 408 returns the data object to the user based on the direct lookup, wherein properties from a lower storage tier are overwritten with values from an upper tier. That is, object attributes from a higher storage tier (e.g., first storage tier 421) take precedence over object attributes saved on a lower storage tier (e.g., third storage tier 423). Thus, portions of the data object duplicated between tiers may be eliminated to provide a user with final query results without duplicated object attribute data.

In implementations, the storage device 408 only accesses the first storage tier 421 to check for an object ID of a tenant query, then returns results from all three tiers 421-423 when the object ID is found on the first storage tier 421. If the storage device 408 does not find a frequently requested object ID in the first storage tier 421, the next update of the storage rules may result in an update to the rules associated with the first storage tier 421 such that future queries will result in the object ID being found in the first storage tier 421. In embodiments, the storage device 408 first checks the first storage tier 421 in response to the received tenant query. If the storage device 408 does not find results on the first storage tier 421, the storage device 408 then progresses to the second storage tier 422, then the third storage tier 423 in turn. In embodiments, the query module 411 of the storage device 408 implements step 507.

First Exemplary Use Scenario

A first exemplary use scenario is described with reference to FIGS. 6, 7A, 8A and 9A. The first exemplary use scenario may be implemented in accordance with the method steps of FIG. 5.

FIG. 6 depicts an example of resources for a book (resource type "book") stored on the storage device 408. In this example, an initial set of storage rules for the book are as follows. A first set of object attributes, which are associated with the first tier 421, include: (1) ISBN, and (2) author. A second set of object attributes, which are associated with the second storage tier 422, include (1) title, (2) subtitle, (3) published, (4) publisher, (5) publisher_homepage, (6) pages, and (7) description. A third set of object attributes, which are associated with the third storage tier, include: (1) review, (2) cover, and (3) content. In this example, a user sends a request to the application module 409 to store the book (data object), and the application module 409 splits the book into three parts for storage across the first, second and third storage tiers 421-423.

FIG. 7A is an initial first storage tier (e.g., topology storage tier) in accordance with aspects of the present invention. FIG. 7B is an adaptive topology storage tier in accordance with aspects of the invention, based on updates to the first storage tier of FIG. 7A, and is discussed in more detail below with respect to an adaptive use scenario. In accordance with the first exemplary use scenario, the storage device 408 stores a first part of the book in the first storage tier 421, as depicted in FIG. 7A. The first part includes an object ID 800 of the book and object attributes "resource_type", "ISBN", and "author".

FIG. 8A is an initial second storage tier (e.g., main object storage tier) in accordance with aspects of the present invention. FIG. 8B is an adaptive main object storage tier in accordance with aspects of the invention based on updates to the second storage tier of FIG. 8A, and is discussed in more detail below with respect to the adaptive use scenario. In accordance with the present example, the storage device 408 stores a second part of the book in the second storage tier 422, as depicted in FIG. 8A.

FIG. 9A is an initial third storage tier (e.g., linked object storage tier) in accordance with aspects of the present invention. FIG. 9B is an adaptive linked object storage tier in accordance with aspects of the present invention based on updates to the second storage tier of FIG. 9A, and is discussed in more detail below with respect to the adaptive use scenario. In accordance with the present example, the storage device 408 stores the remainder of the book (a third part) in the third object tier 423, as depicted in FIG. 9A.

In accordance with the first exemplary use scenario, the storage device 408 receives the following user query (query against the storage): "Give me all books where of author X." This query results in the storage device 408 searching for all documents where resource_type=book AND document attribute author=X. In this example, there is no filter on attributes returned; thus the storage device 408 assumes full content of the document (all object attributes) should be returned. Additionally, in this example there is a filter on the query for the attribute "author"; thus the search for book IDs can be performed using the first storage tier 421, which includes that object attribute "author". The storage device 408 conducts a search of the first storage tier in accordance with the filter, and the application module 409 returns query results in the form of IDs of documents relevant to the query. Utilizing the IDs of the documents, the application module 409 retrieves the object attributes associated with the IDs from the first, second and third storage tiers 421-423. For each document in the query response, the storage device 408: obtains object attributes from the third storage tier 423; adds attributes from the second storage tier 423 to the object attributes of the third storage tier 423, while overwriting any attributes as needed (overwriting duplicate object attributes); and adds attributes from the first storage tier 421, while overwrite attributes if needed (e.g., overwriting duplicate object attributes).

Second Exemplary Use Scenario

In a second exemplary use scenario, the storage device 408 receives the following user query (query against the storage): "Give me title and description of all books of publisher X." This query results in the storage device 408 searching for the selected attributes of documents where resource_type=book AND document attribute publisher=X. In a first step, the storage device 408 initially filters results for the first storage tier 421 by resource type to obtain document IDs. In a second step, the storage device 408 uses the IDs from the first step to read content of the documents to apply filtering by publisher. In this example, the storage device 408 does not need to read the third storage tier 423, as no object attributes to return are located on the third storage tier 423.

Adaptive Use Scenario

An adaptive use scenario is discussed with reference to FIGS. 7B, 8B and 9B, wherein storage rules are automatically adapted to individual tenants of the multi-tenant environment 400. The adaptive use scenario may be implemented in accordance with the method steps of FIG. 5.

The query module 411 collects statistics data regarding attributes associated with user queries for tenants of the storage device 408 over a period of time, and saves the historic tenant data in the query module 411. In this example, statistics for a first tenant include: (1) how frequently an attribute was returned in query results; and (2) how frequently an attribute was used for filtering a query. Additionally, in this example, an attribute "publisher" was frequently used to filter query results, and the attribute "ISBN" has not been used by the first tenant.

The storage module 420 accesses the historic tenant data of the first tenant, and determines that the size of the attribute "cover" is acceptable for the second storage tier 422 based on a stored predetermined threshold value, and determines that the attribute "cover" should be promoted to the first storage tier 421. Additionally, the storage module 420 determines that a size of the attribute "publisher" is acceptable for the first storage tier 421, and thus determines that the attribute "publisher" should be promoted to the first storage tier 421. The storage module 420 further decides to demote the attribute "ISBN" to the second storage tier 422 due to the fact that the attribute "ISBN" has not been used by the first tenant within the amount of time associated with the collection of statistical data.

Based on an analysis of the statistical data collected over time for the tenant, the storage module 420 updates storage rules in the storage module 410 by promoting or demoting object attributes between the first storage tier (e.g., topology tier) 421, the second storage tier (e.g., main object tier) 422 and the third storage tier (e.g., linked object tier) 423. Thus, the storage device 408 included adaptive use functionality to address actual use of the storage device 408 by the first tenant. In this example, implementing adaptive use functionality of the storage device 408 results in storage rules changing from a first configuration (e.g., a default configuration) to an adaptive use configuration, as demonstrated by table 1.

TABLE 1 changes in storage rules.

| Initial Storage Rules | Adaptive Storage Rules |
|---|---|
| First Set of Attributes | |
| ISBN | author |
| author | publisher |
| Second Set of Attributes | |
| title | ISBN |
| subtitle | title |
| published | subtitle |
| publisher | published |
| publisher_homepage | publisher_homepage |
| pages | pages |
| description | description |
| | cover |
| Third Set of Attributes | |
| review | review |
| cover | content |
| content | |

Table 1 depicts changes in attributes between an initial storage configuration and a tenant-specific or adaptive configuration according to the adaptive use scenario. Based on the updated or adaptive storage rules, the storage module 410 updates the first storage tier 421 and the second storage tier 422.

As noted above, FIG. 7B depicts an adaptive first storage tier 421 in accordance with aspects of the invention. As depicted in FIG. 7B, the storage rules for the first storage tier 421 no longer as updated no long include the attribute "ISBN", which was demoted to the second storage tier 422. Additionally, the adaptive storage rules for the first storage tier 421 now include the attribute "publisher".

As noted above, FIG. 8B depicts an adaptive second storage tier in accordance with aspects of the invention. As depicted in FIG. 8B, updated or adaptive storage rules for the second storage tier 422 now include the attribute "cover".

Additionally, as noted above, FIG. 9B depicts an adaptive third storage tier in accordance with aspects of the present invention. In accordance with the adaptive use example, the third storage tier 123 does not require any changes and remains untouched. Thus, the initial third storage tier of 9A is identical to the adaptive third storage tier of FIG. 9B.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

In implementations, a method comprises: deploying a multi-tier, multi-tenant cloud object storage, wherein the storage comprises a topology tier, a main object tier, and a linked object tier; monitoring, for a first tenant, a set of queries and analyzing a first, second, and third set of query attributes associated with each query of the set of queries; determining whether the first set of query attributes meets a topology tier threshold based on the analysis and storing a first portion of a cloud object in the topology tier, wherein the first portion correlates to the first set of query attributes; determining whether the second set of query attributes meets a main object tier threshold based on the analysis and storing a second portion of the cloud object in the main object tier, wherein the second portion correlates to the second set of query attributes; and determining whether the third set of query attributes meets a linked object tier threshold based on the analysis and storing a third portion of the cloud object in the linked object tier, wherein the third portion correlates to the third set of query attributes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   determining, by a multi-tenant storage device, term object attributes utilized in each search query in a set of search queries submitted by a tenant over time, wherein the term object attributes comprise stored data object properties used for querying, and wherein the multi-tenant storage device is configured to store data in a first storage tier, a second storage tier and a third storage tier;
   determining, by the multi-tenant storage device, whether each of the term object attributes utilized in each search query in the set of search queries submitted by the tenant over time meet respective predetermined threshold values for frequency of use in the set of search queries and additional predetermined threshold values for frequency of updates for the first storage tier, the second storage tier and the third storage tier based on statistical data generated for the term object attributes;
   updating, by the multi-tenant storage device, tenant-specific storage rules for at least one of the first storage tier, the second storage tier and the third storage tier based on the determining whether each of the term object attributes utilized in each search query in the set of search queries submitted by the tenant over time meet the respective predetermined threshold values for frequency of use in the set of search queries and the respective additional predetermined threshold values for frequency of updates;
   receiving, by the multi-tenant storage device, a data object from the tenant for storage;

dividing, by the multi-tenant storage device, the data object into at least a first portion and a second portion based on the tenant-specific storage rules of the tenant; and storing, by the multi-tenant storage device, the at least the first portion and the second portion on separate ones of the first storage tier, the second storage tier or the third storage tier based on the tenant-specific storage rules of the tenant.

2. The computer-implemented method of claim 1, further comprising collecting, by the multi-tenant storage device, the query data for the set of search queries, the query data including the term object attributes.

3. The computer-implemented method of claim 1, wherein the dividing the data object into at least the first portion and the second portion comprises dividing the data object into the first portion, the second portion and a third portion.

4. The computer-implemented method of claim 3, wherein the storing at least the first portion and the second portion comprises storing the first portion on the first storage tier, storing the second portion on the second storage tier, and storing the third portion on the third storage tier.

5. The computer-implemented method of claim 1, further comprising determining, by the multi-tenant storage device, whether a size of each of the first portion and the second portion meets a predetermined size threshold, wherein the storing the at least the first portion and the second portion on separate ones of the first storage tier, second storage tier or third storage tier is further based on whether the size of each of the first portion and the second portion meets the predetermined size threshold.

6. The computer-implemented method of claim 1, wherein a service provider performs at least one selected from the group consisting of: creates the multi-tenant storage device, maintains the multi-tenant storage device, deploys the multi-tenant storage device, and supports the multi-tenant storage device.

7. The computer-implemented method of claim 1, wherein the updating the tenant-specific storage rules for each of the first storage tier, second storage tier and third storage tier and the storing the at least the first portion and the second portion on separate ones of the first storage tier, second storage tier or third storage tier are provided by a service provider on a subscription, advertising, and/or fee basis.

8. The computer-implemented method of claim 1, wherein the multi-tenant storage device includes software provided as a service in a cloud environment.

9. A computer program product comprising one or more computer readable storage media and program instructions collectively stored on the one or more computer readable storage media, the program instructions executable by a multi-tenant storage device to cause the multi-tenant storage device to:

generate statistics data regarding term object attributes utilized in a set of search queries submitted by a tenant of the multi-tenant storage device, wherein the term object attributes are properties of stored data objects used for querying;

determine that statistics data for a first object attribute of the term object attributes utilized in the set of search queries submitted by the tenant of the multi-tenant storage device meets a first predetermined threshold value for frequency of use in the set of search queries and a first predetermined threshold value for frequency of updates, each associated with a first storage tier of the multi-tenant storage device;

update tenant-specific storage rules based on the statistics data for the first object attribute of the term object attributes utilized in the set of search queries submitted by the tenant of the multi-tenant storage device meeting the first predetermined threshold value for frequency of use in the set of search queries and the first predetermined threshold value for frequency of updates;

determine that statistics data for a second object attribute of the term object attributes utilized in the set of search queries submitted by the tenant of the multi-tenant storage device meets a second predetermined threshold value for frequency of use in the set of search queries, associated with a second storage tier of the multi-tenant storage device;

update the tenant-specific storage rules based on the statistics data for the second object attribute of the term object attributes utilized in the set of search queries submitted by the tenant of the multi-tenant storage device meeting the second predetermined threshold value;

receive a data object for storage from the tenant;

divide the data object into at least a first portion and a second portion based on the tenant-specific storage rules; and store the first portion on the first storage tier and the second portion on the second storage tier based on the tenant-specific storage rules.

10. The computer program product of claim 9, wherein the program instructions further cause the multi-tenant storage device to collect query data for the set of search queries, the query data including the term object attributes.

11. The computer program product of claim 9, wherein the dividing the data object into at least the first portion and the second portion comprises dividing the data object into the first portion, the second portion and a third portion.

12. The computer program product of claim 11, wherein the program instructions further cause the multi-tenant storage device to store the third portion on a third storage tier based on the tenant-specific storage rules.

13. The computer program product of claim 12, wherein the program instructions further cause the multi-tenant storage device to determine that a size of the third portion meets a predetermined size threshold, wherein the storing the third portion on the third storage tier is based on the determining that the size of the third portion meets the predetermined size threshold.

14. A system comprising:

a processor, a computer readable memory, one or more computer readable storage media, and program instructions collectively stored on the one or more computer readable storage media, the program instructions executable to cause a multi-tenant storage device to:

generate statistics data regarding term object attributes utilized in a set of search queries of a tenant of the multi-tenant storage device;

determine whether each of the term object attributes utilized in the set of search queries of the tenant meet respective predetermined threshold values for frequency of use and respective predetermined threshold values for frequency of updates in the set of search queries for a first storage tier, a second storage tier and a third storage tier of the multi-tenant storage device based on the statistics data;

update tenant-specific storage rules based on the determining whether each of the term object attributes utilized in the set of search queries of the tenant meet the respective predetermined threshold values for frequency of use in the set of search queries and the respective predetermined threshold values for frequency of updates;

receive a data object from the tenant for storage;

divide the data object into at least a first portion and a second portion based on the tenant-specific storage rules; and store the at least the first portion and the second portion on separate ones of the first storage tier, the second storage tier or the third storage tier based on the tenant-specific storage rules.

15. The system of claim 14, wherein the dividing the data object into at least the first portion and the second portion comprises dividing the data object into the first portion, the second portion and a third portion.

16. The system of claim 15, wherein the program instructions further cause the multi-tenant storage device to store the third portion on a third storage tier based on the tenant-specific storage rules.

17. The system of claim 16, wherein the program instructions further cause the multi-tenant storage device to determine that a size of the third portion meets a predetermined size threshold, wherein the storing the third portion on the third storage tier is based on the determining that the size of the third portion meets the predetermined size threshold.

* * * * *